(12) United States Patent
Connell

(10) Patent No.: US 10,154,126 B2
(45) Date of Patent: *Dec. 11, 2018

(54) MODULAR SYSTEM CONNECTION ASSIGNMENT

(71) Applicant: Motorola Mobility LLC, Chicago, IL (US)

(72) Inventor: Nathan Connell, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,670

(22) Filed: Oct. 7, 2016

(65) Prior Publication Data

US 2017/0359454 A1 Dec. 14, 2017

Related U.S. Application Data

(60) Provisional application No. 62/348,121, filed on Jun. 9, 2016.

(51) Int. Cl.
*H04B 7/00* (2006.01)
*H04M 1/04* (2006.01)
*H04L 5/00* (2006.01)
*H04M 1/02* (2006.01)

(52) U.S. Cl.
CPC ............ *H04M 1/04* (2013.01); *H04L 5/0055* (2013.01); *H04M 1/0264* (2013.01); *H04M 1/0274* (2013.01)

(58) Field of Classification Search
CPC ...... H04L 5/0055; H04M 1/0264; H04M 1/04
See application file for complete search history.

(56) References Cited

U.S. PATENT DOCUMENTS

| | | | |
|---|---|---|---|
| 2003/0199182 A1* | 10/2003 | Koehler | H01R 12/585 439/79 |
| 2007/0093277 A1* | 4/2007 | Cavacuiti | H04M 1/72527 455/566 |
| 2015/0296171 A1* | 10/2015 | Lakkundi | G06F 1/1632 386/200 |

* cited by examiner

*Primary Examiner* — Tuan Pham
(74) *Attorney, Agent, or Firm* — Miller, Matthias & Hull LLP

(57) ABSTRACT

A modular device system includes a base portable electronic communication device and an add-on module. A multi-pin connector array on the base portable electronic communication device includes multiple connectors supporting one or more data speeds and other functionality. The array is configured and located to electrically connect to a mating array on the add-on module when the add-on module is mated to the base portable electronic communication device.

8 Claims, 10 Drawing Sheets

MODULAR SYSTEM CONNECTION ASSIGNMENT

CROSS-REFERENCE TO RELATED APPLICATION

This application claims the benefit of U.S. Provisional Application Ser. No. 62/348,121, filed on Jun. 9, 2016, which is incorporated herein by reference.

TECHNICAL FIELD

The present disclosure is related generally to mobile communication devices, and, more particularly, to a system and method for interconnecting devices in a modular portable device system.

SUMMARY

In keeping with an embodiment of the disclosed principles, a modular device system is provided having a base portable electronic communication device with a multi-pin connector array, the connector array having multiple pins supporting multiple data speeds between and including low speed data and high speed data, wherein the multi-pin connector array is configured and located to electrically connect to a mating array on a module device when the module device is mated to the base portable electronic communication device. The base portable electronic communication device further includes out-of-band hardware RFR for SPI. In an alternative embodiment, the base portable electronic communication device includes support for in-band ACK/NACK for SPI.

Other features and aspects of embodiments of the disclosed principles will be appreciated from the detailed disclosure taken in conjunction with the included figures.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used.

Figure 1:
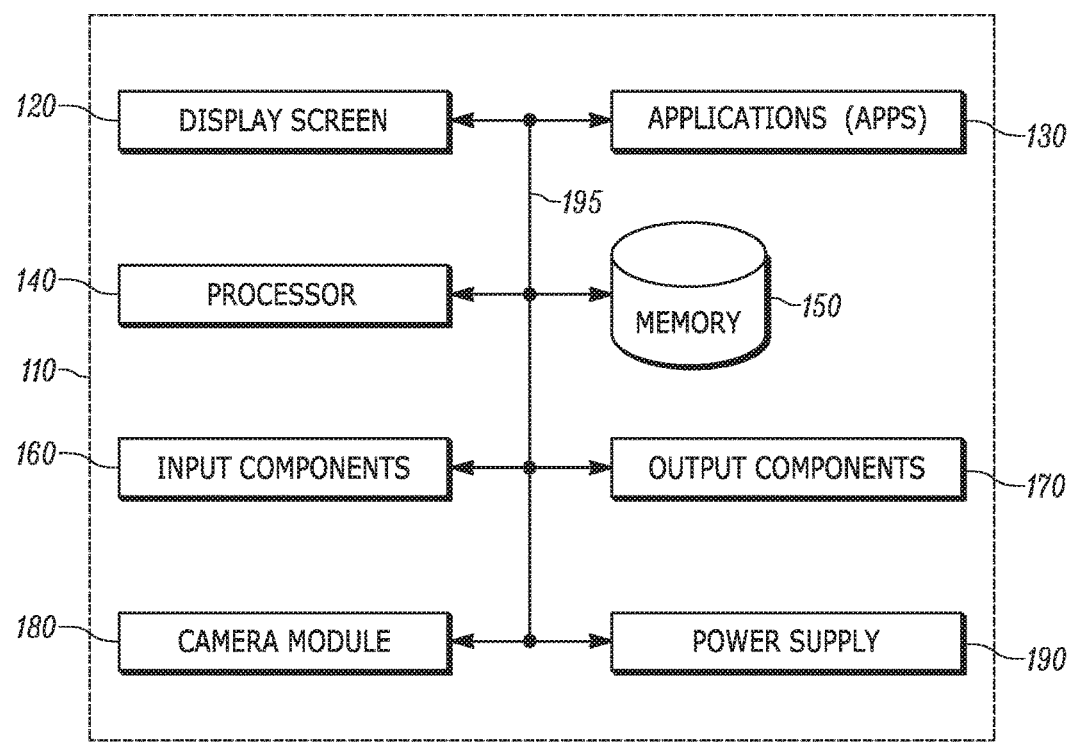
FIG. 1 is a simplified schematic of an example configuration of device components with respect to which embodiments of the presently disclosed principles may be implemented.

The schematic diagram of FIG. 1 shows an exemplary component group 110 forming part of an environment within which aspects of the present disclosure may be implemented. In particular, the component group 110 includes exemplary components that may be employed in a device corresponding to the first device or phone, and the second device. It will be appreciated that additional or alternative components may be used in a given implementation depending upon user preference, component availability, price point, and other considerations.

In the illustrated embodiment, the components 110 include a display screen 120, applications (e.g., programs) 130, a processor 140, a memory 150, one or more input components 160 (user input receiver) such as speech and text input facilities, and one or more output components 170 such as text and audible output facilities, e.g., one or more speakers. In an embodiment, the input components 160 include a physical or virtual keyboard maintained or displayed on a surface of the device. In various embodiments motion sensors, proximity sensors, camera/IR sensors and other types of sensors may be used to collect certain types of input information such as user presence, user gestures and so on.

The processor 140 may be any of a microprocessor, microcomputer, application-specific integrated circuit, and like structures. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read only memory (i.e., a hard drive, flash memory or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device. Such functions may include, for example, interaction among various internal components and storage and retrieval of applications and data to and from the memory 150.

Further with respect to the applications 130, these typically utilize the operating system to provide more specific functionality, such as file system services and handling of protected and unprotected data stored in the memory 150. Although some applications may provide standard or required functionality of the user device 110, in other cases applications provide optional or specialized functionality, and may be supplied by third party vendors or the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation. The device 110 also includes a camera module 180, which is linked to a device camera.

In an embodiment, a power supply 190, such as a battery or fuel cell, is included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform certain functions. The processor 140 may include or implement various modules and execute programs for initiating different activities such as launching an application, transferring data, and toggling through various graphical user interface objects (e.g., toggling through various display icons that are linked to executable applications).

Applications and software reside on a tangible non-transitory medium, e.g., RAM, ROM or flash memory, as computer-readable instructions. The device 110, via its processor 140, runs the applications and software by retrieving and executing the appropriate computer-readable instructions.

Figure 2:
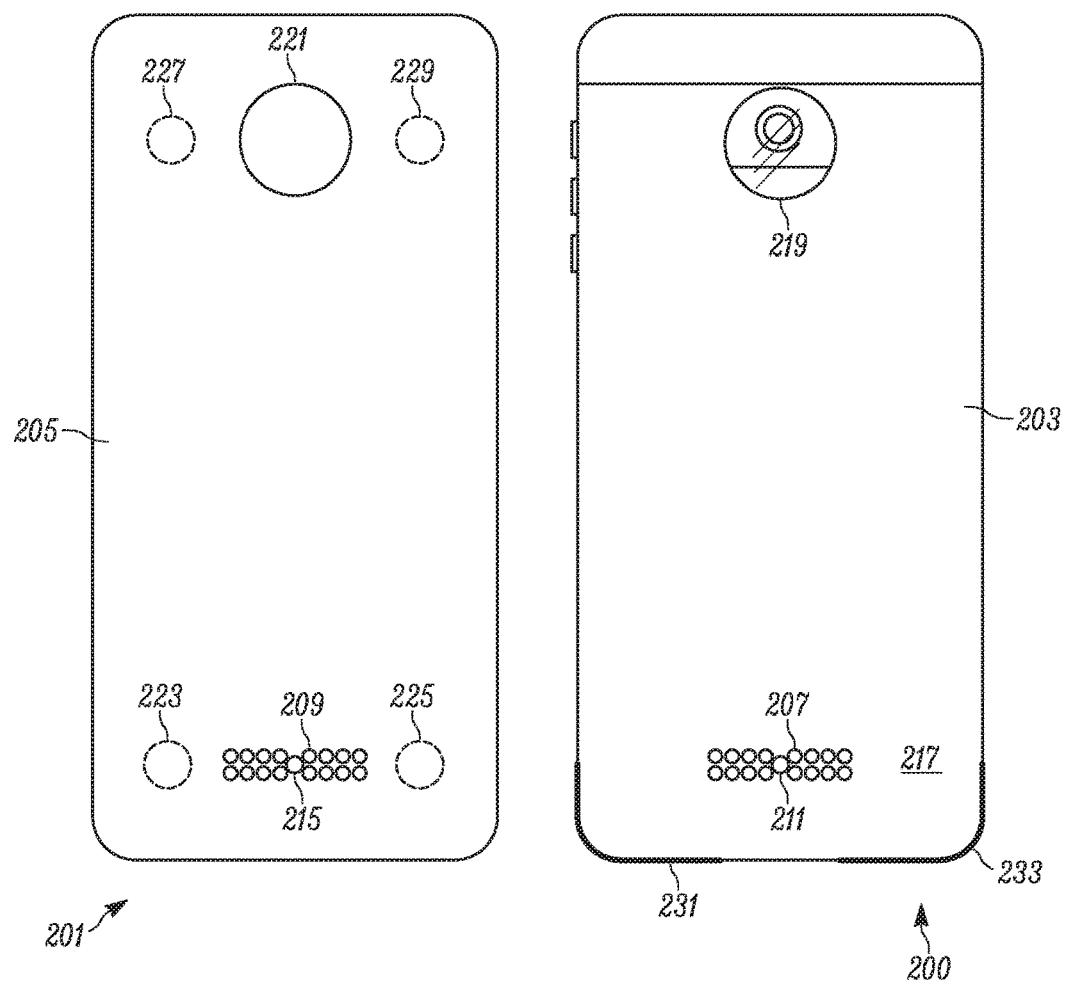
FIG. 2 is a view of a first device, e.g., a mobile phone, tablet or other processor-based device, and a second device, e.g., an add-on module providing additional functionality or capabilities, showing the back of the first device and the front of the second device in accordance with an embodiment of the disclosed principles.

Turning to FIG. 2, this figure illustrates a simplified view of the phone 200 and the module 201, showing the back 203 of the phone 200 and the mating front 205 of the module 201 in accordance with an embodiment of the disclosed principles. In the illustrated example, each device 200, 201 includes a connector array 207, 209. Although each connector array 207, 209 is shown as a 16-pin connector array, it will be appreciated that other numbers of pins may be used. Although not detailed in the figure, one of the connector arrays 207, 209 will typically include spring-loaded male pins while the other 207, 209 will typically include corresponding female sockets or contacts. The phone 200 also includes one or more antennas 231, 233.

In the illustrated embodiment, an alignment socket 211 is included within the connector array 207 on the phone 200, for mating with a matching alignment pin 215 on the module 201. A second alignment point is provided by a camera protrusion 219 on the phone 200, which is configured and located to fit with a mating circular opening 221 in the module 201. In an embodiment, the camera protrusion 219 contains the main camera of the device 200 as well as one or more flash LEDs. In an embodiment, the camera protrusion 219 also includes a laser range-finder for faster focus of the main camera.

As noted above, although other camera protrusion shapes are usable and are contemplated herein, a circular shape will be used for the sake of example. Depending upon tolerances in a given implementation, a non-circular camera protrusion may provide a degree of rotational alignment as well and may limit or eliminate the need for other alignment features.

In an embodiment, a set of magnets 223, 225, 227, 229 is embedded in the front of the module 201. These magnets 223, 225, 227, 229 may be retained on an inner surface of this cosmetic sheet. These magnets may be encased in a steel shroud such that the magnetic field is focused to one side of the magnet assembly rather than extending to both sides. In an embodiment, these magnets 223, 225, 227, 229 attract the steel surface of the back 203 of the phone 200 so as to hold the devices 200, 201 together once the devices 200, 201 are in close proximity. The magnets 223, 225, 227, 229 may be of ceramic, neodymium or other type.

Figure 3:
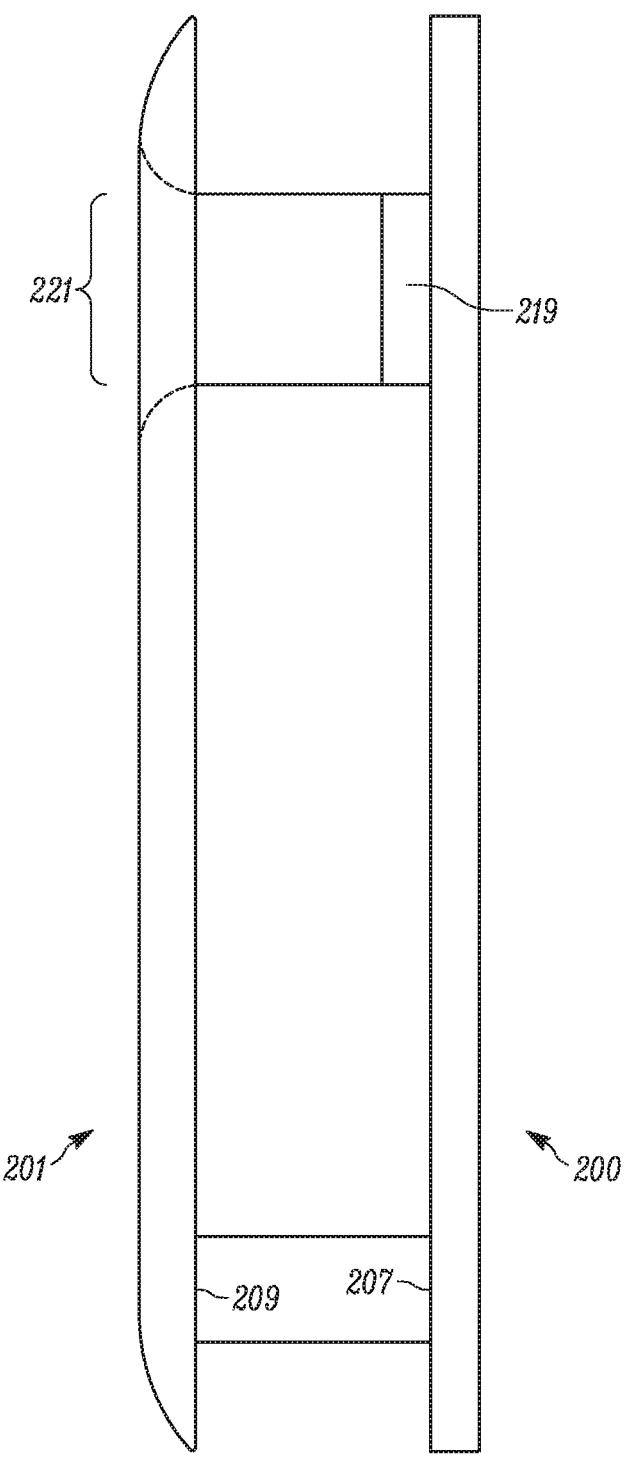
FIG. 3 is a side view of a phone and module in accordance with an embodiment of the disclosed principles.

FIG. 3 is a side view of the phone 200 and the module 201 in accordance with an embodiment of the disclosed principles. As briefly shown in the side view of FIG. 3, when the phone 200 and the module 201 are docked together, the camera protrusion 219 fits into the mating opening 221 in the module 201. In addition, the contact array 207 of the phone 200 mates with the contact array 209 of the module 201 in this configuration.

Ideally the combined device acts as one, using the connections provided by the mating contact arrays 207, 209. In particular, the contact arrays 207, 209 are used in various embodiments to exchange data, commands, power, control signals and so on.

Figure 4:
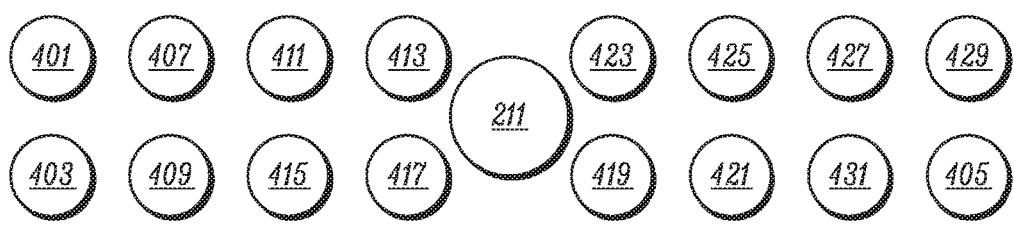
FIG. 4 is a schematic diagram showing interconnection pin groupings in accordance with an embodiment of the disclosed principles.

FIG. 4 is a schematic map of the individual connectors of the connector arrays 207, 209 in an embodiment of the disclosed principles. The connectors include B+ (401), GND (×2) (403, 405), VBUS (407), CC (409), SPI CS N 12C SDA (411), SPI CLK 12C SCL (413), MPHY TXp (415), MPHY TXm (417), MPHY RXp (419), MPHY RXm (421), USB Dp (423), USB Dm (425), SPI MISO (427), SPI MOSI (429) and myDP CWIRE (431). Though not necessarily to scale, the alignment socket 211 is shown as well in FIG. 4 in order to convey the directionality of the elements.

The connectors MPHY TXp (415), MPHY TXm (417), MPHY RXp (419) and MPHY RXm (421) are used to transfer High Speed Data/Digital Audio between the phone and the module when appropriate. The USB Dp (423) and USB Dm (425) connectors are used for USB2.0, while the myDP CWIRE (431) connector provides Mobility Display Port data. The SPI CS N 12C SDA (411), SPI CLK 12C SCL (413), SPI MISO (427) and SPI MOSI (429) connectors serve Low Speed Data exchanges, while the B+ (401) and CC (409) connectors provide power and command/control respectively. Finally, the VBUS (407) connector provides charging, via the exchange of current at appropriate voltage between the phone and module.

Figure 5:
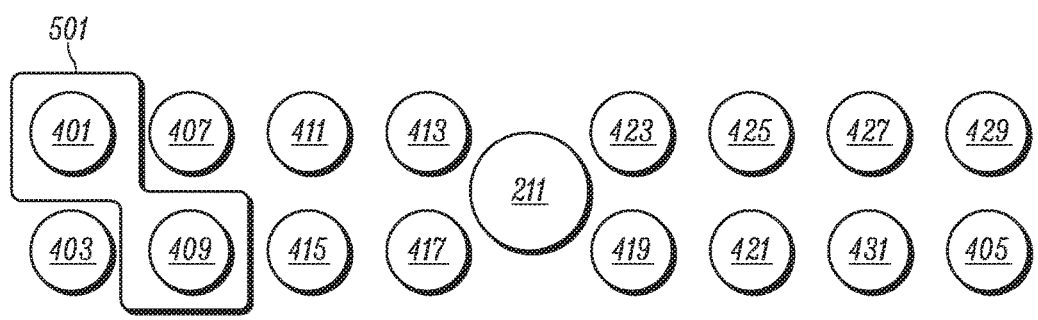
FIG. 5 is a schematic diagram showing a 2-pin interconnection pin grouping in accordance with an embodiment of the disclosed principles.

Not all systems need to include all connectors, so it is useful to consider what capabilities are enabled by various connector groupings. A two-pin module may have only the B+ (401) and CC (409) connectors, as shown in the group 501 in FIG. 5. Such a system would be able to provide a one-wire comm bus, phone-powered module, operating at variable data rates using a protocol such as Greybus.

Figure 6:
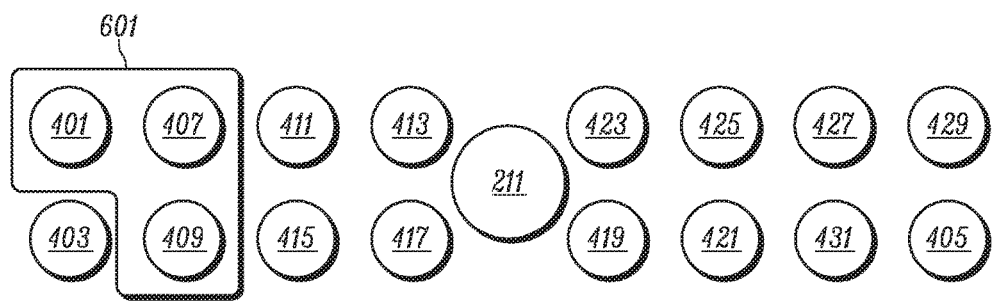
FIG. 6 is a schematic diagram showing a 3-pin interconnection pin grouping in accordance with an embodiment of the disclosed principles.
Figure 7:
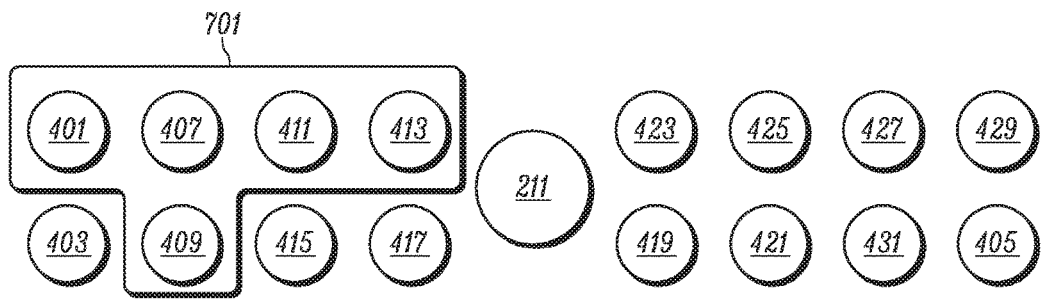
FIG. 7 is a schematic diagram showing a 5-pin interconnection pin grouping in accordance with an embodiment of the disclosed principles.

Similarly, a three-pin module may have the B+ (401) and CC (409) connectors, as well as the VBUS (407) connector, as shown in the group 601 in FIG. 6. In addition to the capabilities provided by a two-pin interface, such a system would also be able to provide for a self-powered module and charging between the devices. A five-pin connector group 701 as shown in FIG. 7 would be able to provide, in addition to the capabilities of a three-pin interface, I2C communications and a 400 kbps data rate for Greybus communications or the like.

Figure 8:
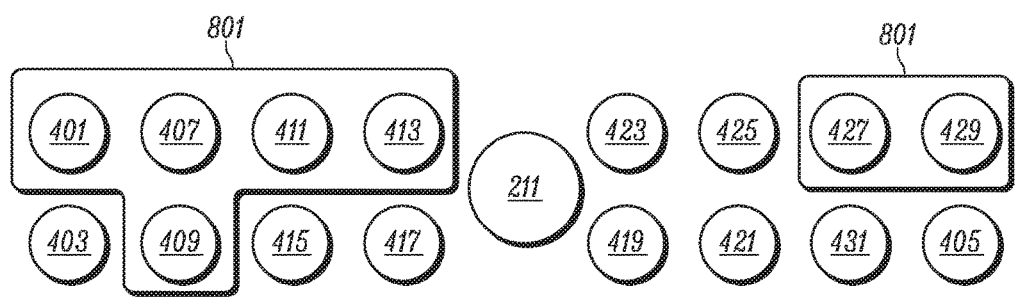
FIG. 8 is a schematic diagram showing a 7-pin interconnection pin grouping in accordance with an embodiment of the disclosed principles.
Figure 9:
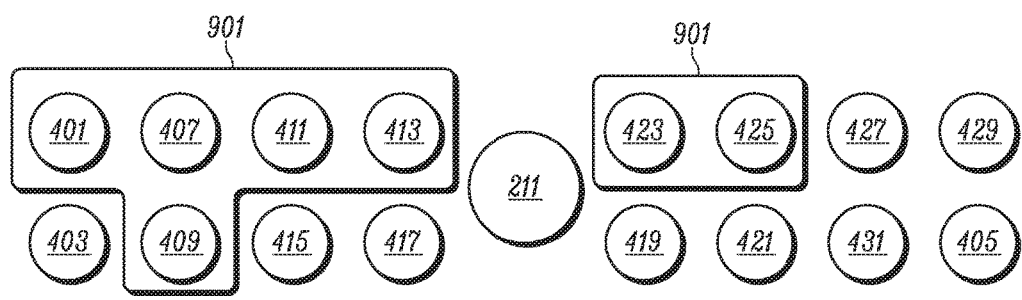
FIG. 9 is a schematic diagram showing an alternative 7-pin interconnection pin grouping in accordance with an embodiment of the disclosed principles.

Continuing, a seven-pin interface including the SPI MISO (427) and SPI MOSI (429) connectors, as shown in the group 801 in FIG. 8, would add additional capabilities including SPI communications and data rates of 20 Mbps. Alternatively, a seven-pin interface including the USB Dp (423) and USB Dm (425) connectors, as shown in the group 901 in FIG. 9, would add additional capabilities including USB2.0 communications and data rates of 480 Mbps.

Figure 10:
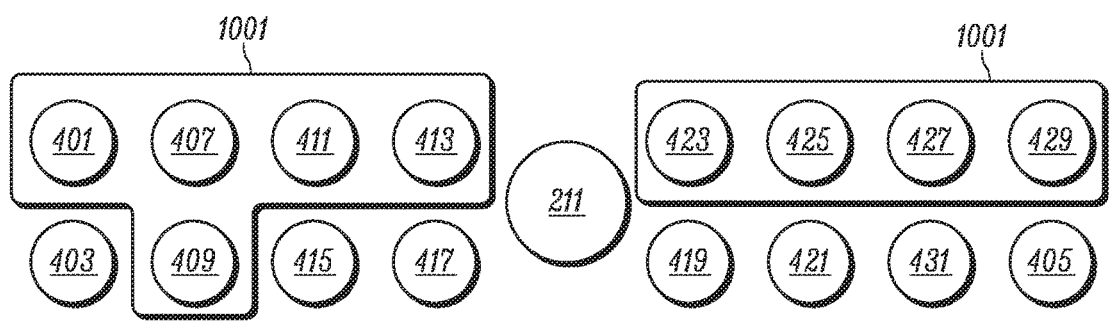
FIG. 10 is a schematic diagram showing a 9-pin interconnection pin grouping in accordance with an embodiment of the disclosed principles.

A nine-pin interface might include both the SPI MISO (427) and SPI MOSI (429) connectors and the USB Dp (423) and USB Dm (425) connectors, as shown in the group 1001 of FIG. 10. This interface would add additional capabilities including SPI and USB2.0 communications as well as data rates of 20 Mbps and 480 Mbps. A ten-pin interface that further includes the myDP CWIRE (431) connector would additionally provide myDP communications as well as display and embedded audio capabilities.

Finally, a 14-pin interface that includes all pins except the ground pins (403, 405) would support full capabilities including 1-wire, I2C, SPI, USB2.0, USB3.1, myDP, Unipro and 12S communications, phone-powered and self-powered module operation, charging, Greybus, raw audio, embedded audio, display and camera capabilities, and data rates of 400 kbps, 20 Mbps, 480 Mbps and 5 Gbps.

Figure 11:
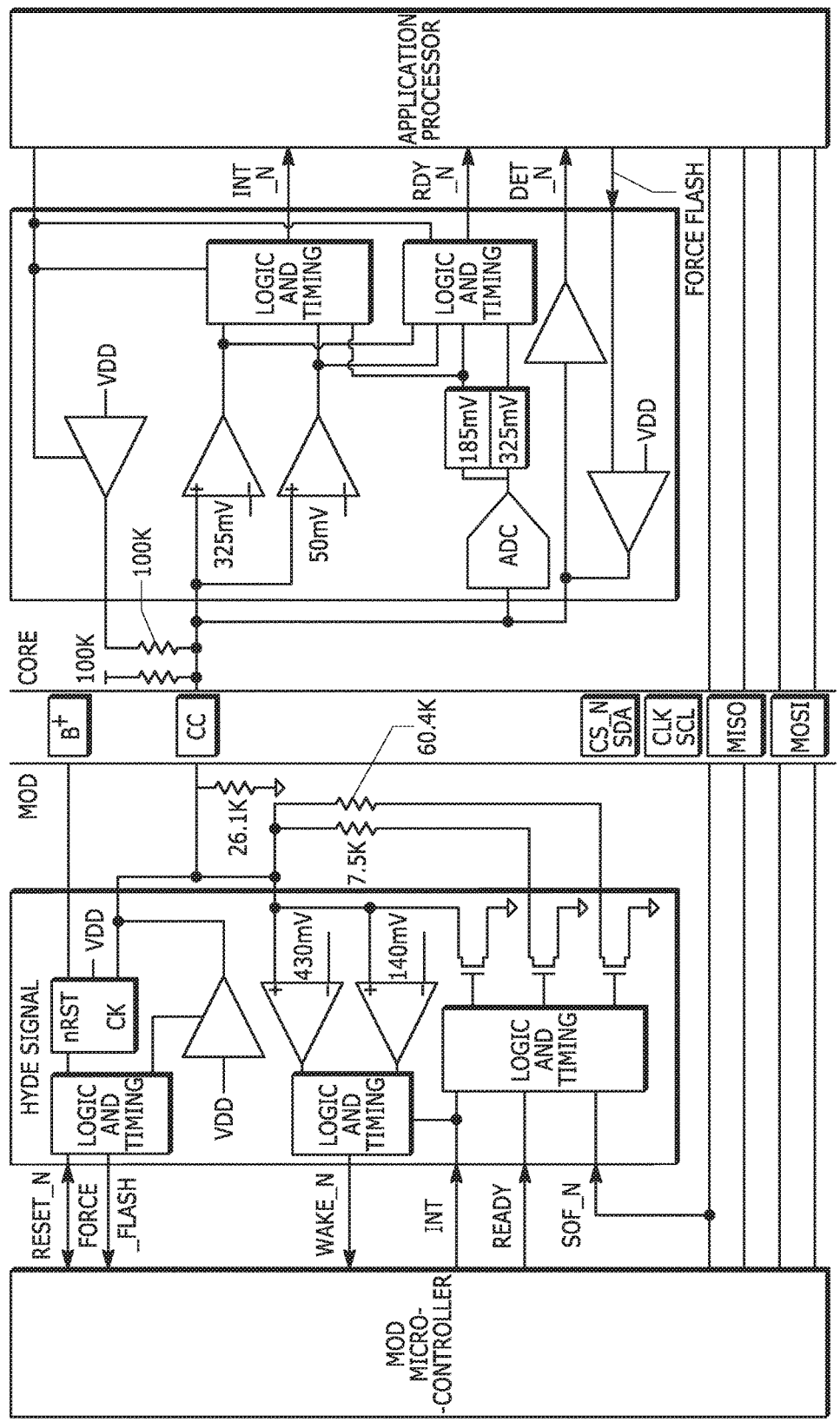
FIG. 11 is a schematic circuit diagram in accordance with an embodiment of the disclosed principles showing out-of-band hardware RFR for SPI.
Figure 12:
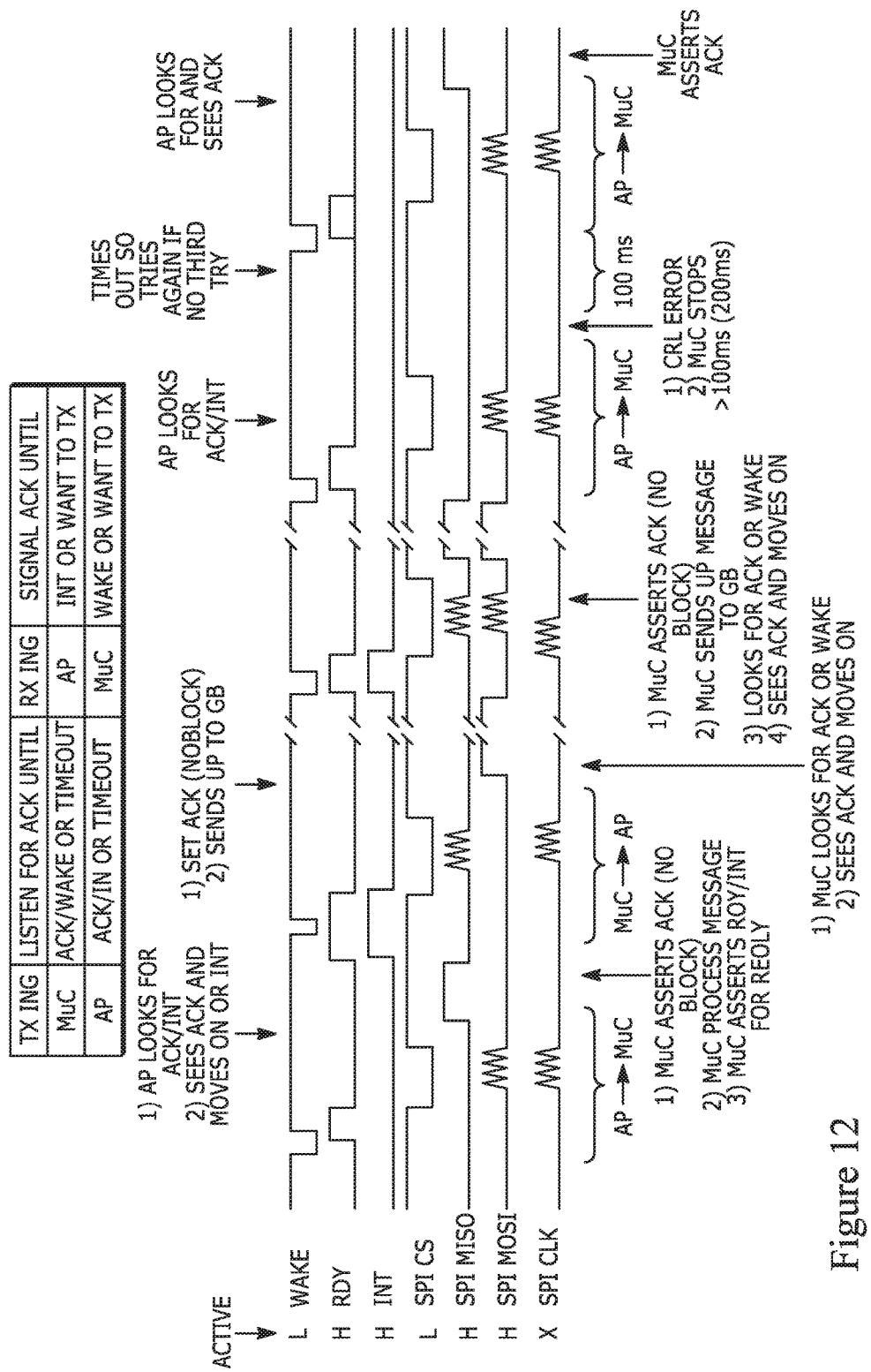
FIG. 12 is a timing diagram in accordance with an embodiment of the disclosed principles pertaining to in-band ACK/NACK for SPI.
Figure 13:
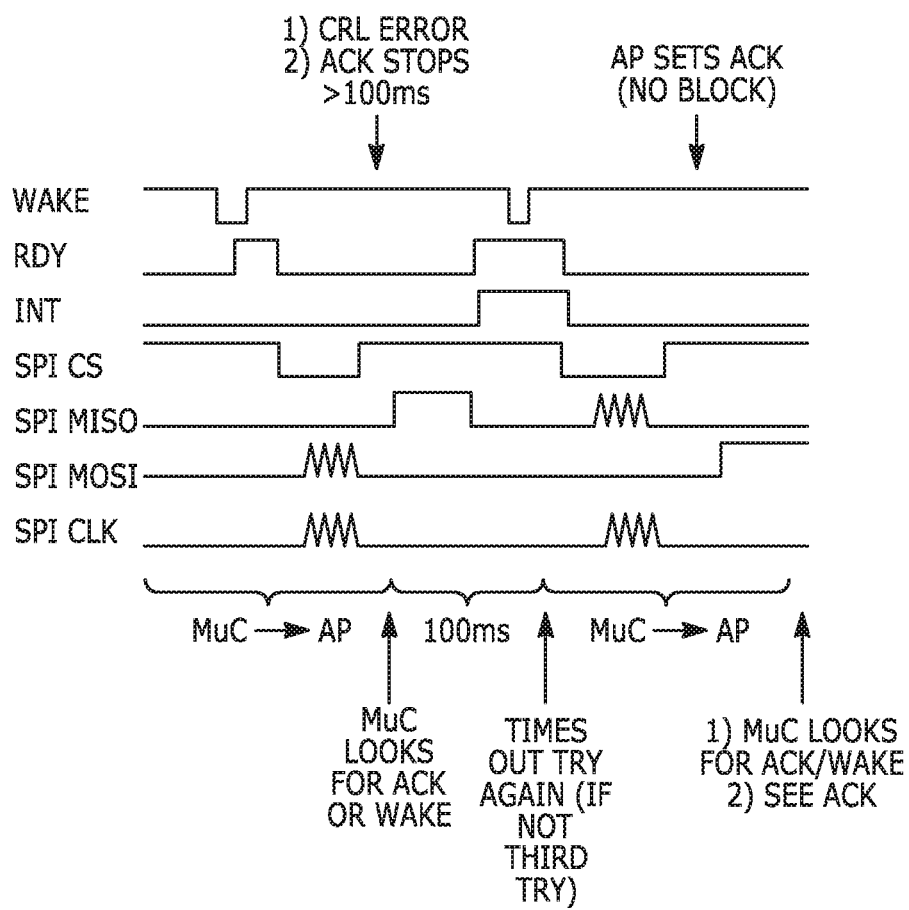
FIG. 13 is another timing diagram in accordance with an embodiment of the disclosed principles pertaining to in-band ACK/NACK for SPI.

The module and base device architectures with respect to the connector array may be as shown in FIG. 11. In particular, FIG. 11 is a schematic circuit diagram in accordance with an embodiment of the disclosed principles showing out-of-band hardware RFR for SPI. Of note is the "SOF" input to PLD "Hyde Signal." FIGS. 12 and 13 illustrate various communication timing scenarios in keeping with embodiments of the disclosed principles with respect to in-band ACK/NACK for SPI.

It will be appreciated that a system and method for improved connectivity in a modular system have been described herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A modular device system including a base portable electronic communication device having a multi-pin connector array, the connector array having multiple pins supporting multiple data speeds between and including low speed data and high speed data, wherein the multi-pin connector array is configured and located to electrically connect to a mating array on a module device when the module device is mated to the base portable electronic communication device, the base portable electronic communication device further including out-of-band hardware for Serial Peripheral Interface (SPI), the out-of-band hardware including a plurality of hardware connection linking a processor of the base portable electronic communication device to a processor of the module device.

2. The modular device system in accordance with claim 1, wherein the multi-pin connection array includes multiple pin contacts.

3. The modular device system in accordance with claim 1, wherein the multi-pin connection array includes multiple spring-loaded pins.

4. The modular device system in accordance with claim 1, wherein the base portable electronic communication device further comprises a camera protrusion and at least one alignment feature configured and located such that the multi-pin connection array mates with the mating array on the module device when the module device is docked to the base portable electronic communication device.

5. A modular device system including a base portable electronic communication device having a multi-pin connector array, the connector array having multiple pins supporting multiple data speeds between and including low speed data and high speed data, wherein the multi-pin connector array is configured and located to electrically connect to a mating array on a module device when the module device is mated to the base portable electronic communication device, the base portable electronic communication device including out-of-band hardware having a plurality of hardware connection linking a processor of the base portable electronic communication device to a processor of the module device for Serial Peripheral Interface (SPI) signals other than ACK/NACK and including support for in-band ACK/NACK.

6. The modular device system in accordance with claim 5, wherein the multi-pin connection array includes multiple pin contacts.

7. The modular device system in accordance with claim 5, wherein the multi-pin connection array includes multiple spring-loaded pins.

8. The modular device system in accordance with claim 5, wherein the base portable electronic communication device further comprises a camera protrusion and at least one alignment feature configured and located such that the multi-pin connection array mates with the mating array on the module device when the module device is docked to the base portable electronic communication device.

\* \* \* \* \*